INVENTOR
JOHN R. VANDE WEGE
BY Bernard E. Franz
ATTY.

United States Patent Office 3,509,532
Patented Apr. 28, 1970

3,509,532
INEQUALITY TEST CIRCUIT FOR DUPLICATED CONTROL UNITS
John R. Vande Wege, Glen Ellyn, Ill., assignor to Automatic Electric Laboratories, Inc., Northlake, Ill., a corporation of Delaware
Original application Dec. 29, 1965, Ser. No. 517,226, now Patent No. 3,452,159. Divided and this application Nov. 29, 1968, Ser. No. 780,125
Int. Cl. H04l 1/00
U.S. Cl. 340—146.1                    7 Claims

ABSTRACT OF THE DISCLOSURE

The marker of a communication switching network is duplicated for reliability, and they are alternately actively on line. Each marker has an inequality test circuit which includes a relay to check that a given signal is received by both. A mismatch signal is generated via contacts of the two relays connected in such a manner that even though there is a failure in one inequality test circuit, the mismatch signal is detected by at least one marker at the time it is on-line.

---

This is a division of my copending application Ser. No. 517,226 filed Dec. 29, 1965, for a Communication Switching Marker, now Patent No. 3,452,159.

This invention relates to an inequality test circuit used in two markers which are alternately in active on-line service with frequent switching between on-line and stand-by of the two markers.

For reliability purposes two redundant markers are provided with only one marker in active on-line service at a time with the other marker on standby. An allotter switches the markers between active on line and standby service at frequent regular intervals.

An object of the invention is to provide an inequality test circuit which will detect one fault regardless of an additional fault also existing in the inequality test apparatus. A problem with fault detectors using a comparison arrangement to compare a signal in two units is that a comparison device has to be employed which is assumed to be correct. Any fault in the comparison device which yields a "good check" signal constantly renders the check useless.

According to the invention an inequality test circuit is provided in which each marker has test circuitry for monitoring a given signal condition, such as the call-for-service signal, and the signal condition from the two markers is compared to generate a mismatch signal if the signal differs in the two markers, fault indicating signal being generated and supplied in both markers. The arrangement is such that while the test circuitry might be defective in one marker and therefore fail to generate the fault-indicating signal when another fault exists, the other marker will come on line regularly and its inequality testing circuitry will then detect the fault. Thus advantage is taken of the fact that two units (e.g. markers) are alternately active to use time as a factor to detect a fault on one unit, even though that unit also has a fault in its inequality test circuit; the other unit at a different time becomes active and its inequality test circuit will detect the fault.

In the detailed description and drawings the inequality test circuit is referred to as a parity check circuit, the word parity being used in its ordinary dictionary sense as the quality or condition of being equal or equivalent.

The above-mentioned and other objects and features of this invention and the manner of attaining them will become more apparent, and the invention itself will be best understood, by reference to the following description of an embodiment of the invention taken in conjunction with the accompanying drawings comprising FIGS. 1 to 3 wherein.

Figure 1:
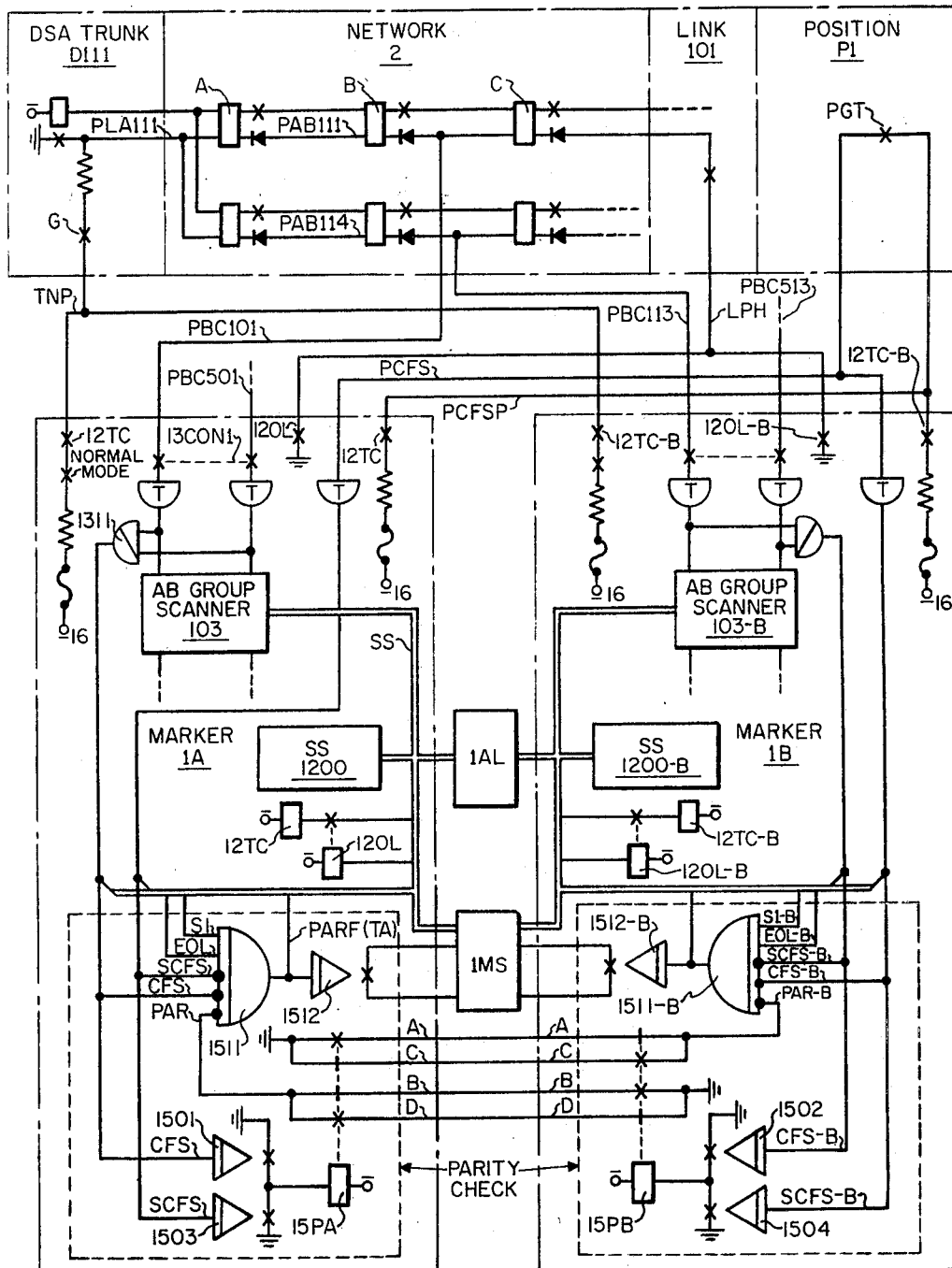
FIG. 1 is a schematic and functional block diagram of a parity check arrangement incorporated in two markers controlling a dial service assistance trunk and operator position group with a connecting switching network.

In describing the apparatus in the system various conventions have been used. For example, a minus sign adjacent a small circle representing a terminal indicates —50 volt connection from the exchange battery. A specific number along with the sign adjacent a terminal indicates that value of voltage from an electronic power supply, for example —16 indicates a negative 16-volt potential connection. The relay circuits used in the system include both conventional telephone type relays in which an armature attracted by a core actuates a plurality of contact sets, and also relays of the reed type in which the contact sets are in sealed reed capsules encircled by the relay winding or windings. There is no indication in the present disclosure distinguishing these two types of relays since this fact is not pertinent to the invention. While the relays are shown with large numbers of contact sets, in actual practice slave or parallel connected relays may be used to actuate some of these contacts.

The electronic logic circuitry used in this system is direct-coupled (D.C.), that is, signals are represented by steady-state voltages. Two levels are employed. The first level is a negative potential, and represents the binary one, true, on, or active condition. The second level is ground potential and represents the binary zero, false, off, or inactive condition. These logic circuits along with flip-flops for counting and register purposes are used in the various scanners disclosed herein in block diagram form.

The logical circuits use NOR gates, each of which is a one-transistor logical element whose output is true if all of the inputs are false, and whose output is false if any one of the inputs is true. The inputs are coupled through individual resistors to the base electrode, and the output is taken from the collector electrode.

A relay driver is a circuit represented by a triangle having a line across it parallel to the base, with a single input to the base, and a contact adjacent to the apex. Each relay driver comprises a single transistor with the input connection to its base electrode, and a winding in the collector circuit which operates the single contact.

An inverter amplifier is a circuit similar to a NOR gate, except that it has only a single input. For convenience in the drawings, most of the logic gate circuits have been represented by AND gates and OR gates. In actual implementation an AND gate is achieved by using a NOR gate with each of the inputs inverted, and an OR is obtained by using a NOR followed by an inverter amplifier. It may be readily seen that in situations in which AND functions and OR functions appear alternately in tandem that NOR gatse may be used with no inverters between them. A dot or small circle at an input or output designates an inversion or inhibit function.

In describing the logical operations performed by the gate circuits, Boolean algebra equations are used. In this notation the addition symbol signifies OR, the multiplication symbol, expressed or implied, signifies AND, and overlining signifies the inverted condition.

A test gate is a NOR gate designed to detect a negative input potential as a true condition and an open connection or ground as a false condition, while a regular NOR gate recognizes an open connection or negative potential as a true condition and ground potential as a false condition. A test gate is indicated in the drawings by a T within the gate symbol.

Referring to FIG. 1, there is shown a symbolic diagram of a DSA (dial service assistance) trunk D111 connected through a three stage coordinate switching matrix 2, to a link L101 associated with an operator's position P1. The switching network is controlled by markers 1A and 1B alternately, comprising electronic scanners, relay trees, and other components. In this figure the trunk, link, position and marker circuits have shown only the circuit apparatus needed to describe the parity check circuits. The switching network 2 comprises three stages of coordinate arrays of crosspoint relays, each crosspoint relay having an operate or pull winding in series with a diode, a hold winding in series with one of its own contacts and five other contacts for respective conductors of a switched path. The interstage links have a P conductor series connecting the pull windings, a C conductor series connecting the hold windings, and five other switched conductors (not shown). Certain of the P conductors of the network are connected via relay trees to a trunk identifier in the marker, and the hold leads of all of the interstage links are connected through relay trees to a path control scanner in the marker, as shown and described in the parent patent.

Figure 2:
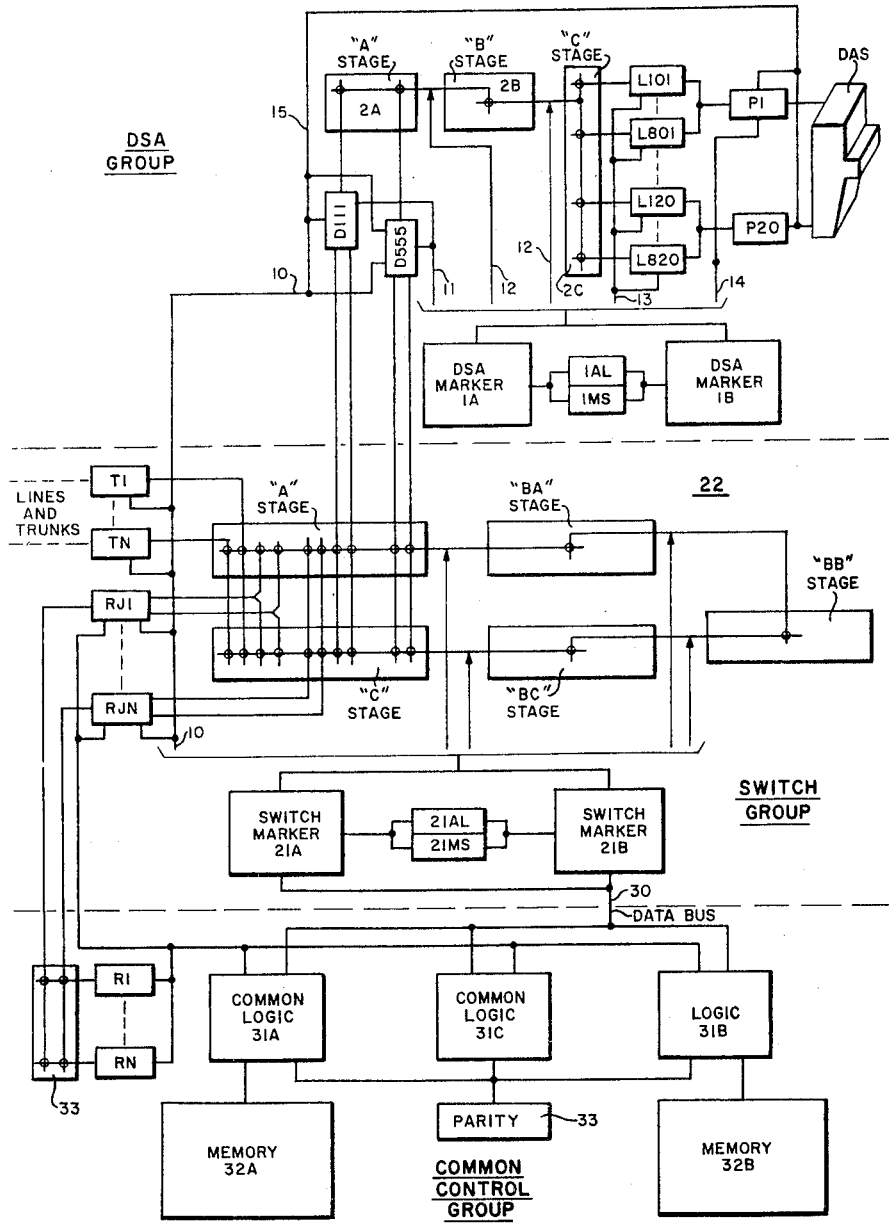
FIG. 2 is a block diagram of a system incorporating the arrangement of FIG. 1.

FIG. 2 is a block diagram of the principal portions of a complete exchange. The *DSA* (*dial service assistance*) group at the top of the figure corresponds to the arrangement shown symbolically in FIG. 1. The exchange also includes a *switch group* shown in the center of the figure, and a *common control group* shown at the bottom of the figure. The switch group comprises a five stage network 22 for connecting together any two of a plurality of terminals. These terminals include a plurality of line and trunk circuits T1–TN of various types, a plurality of register junctor circuits RJ1–RJN, and the dial service assistance trunks D111–D555. Each of the terminal circuits T1–TN has one network terminal connection having two appearances, one at the A stage and one at the C stage. Each of the register junctor circuits has two network terminals one for receiving and one for sending, each likewise having both an A appearance and a C appearance. Each of the DSA trunks D111–D555 has two switch group network terminals, one for front connections and one for rear connections, each of these terminals having likewise both an A appearance and a C appearance at the network 22. Each of the DSA trunks D111–D555 also has one terminal appearance at the A stage 2A of the DSA group switching network 2. In addition to the A and C stages, the network 22 includes a BA stage, a BB stage and a BC stage, the entire network being a non-blocking configuration. Connections through network 22 are controlled by one of the two markers 21A and 21B, these markers being alternately on-line. An allotter 21AL and a maintenance section 21MS is common to the two switch markers 21A and 21B.

The common control group includes three common logic units 31A, 31B, and 31C, each of which receives and processes all call information simultaneously. A parity circuit 33 includes comparison apparatus for determining whether all three of the common logic units are in agreement, and for causing appropriate operating and maintenance action to be taken if they are not in agreement. Memories 32A and 32B are associated respectively with the common logic units 31A and 31B. Output information is taken only from one of the common logic units 31A or 31B at any one time. The common control group also includes a coordinate switching matrix 33 for connecting any one of the register junctors to any one of a plurality of receivers or transceivers R1–RN. These units individually are arranged for interexchange multifrequency receiving and sending or for subscriber touch calling multifrequency signaling. Dial pulse signaling is detected in the register junctor in which case no connection via matrix 33 is required. Each of the switch terminations also has a connection, not shown, to the common control for busy indication.

In the DSA group the dial assistance switchboard DAS has twenty positions P1–P20, and each position has eight links, those associated with position P1 being designated L101–L801 and those associated with position 20 being designated L120–L820. Each link may be connected via the network 2 having the three stages, 2A, 2B and 2C to any one of the DSA trunks D111–D555. The connections through the network 2 are controlled via the DSA markers 1A and 1B which are alternately on line. Common to the two markers there is an allotter 1AL and a maintenance section 1MS. Only one of the two markers is on line at any one time.

Assume now that a call is received at terminal circuit T1 from a subscriber line to be completed to an operator. All of the terminal circuits of the switch group are connected in multiple via a multiconductor group 10 to the two switch markers 21A and 21B, and P and C conductors of the interstage links are also connected to the marker in a manner similar to those in the DSA marker 1A. Assuming that marker 21A is on line, the call is detected and identified via conductors in group 10. The information is forwarded from the marker via a multiconductor data bus 30 to the common logic units of the common control group. The common control then selects an idle register junctor such as RJ1 and via the data bus conductors 30 supply the terminal information for terminals T1 and the receiving terminal of RJ1 to the marker 21A. The marker then selects and establishes an idle path between these two terminals through the five stages of network 22 and releases. The common control group connects the junctor RJ1 via matrix 33 to a local subscriber touch calling receiver such as R1. The subscriber then transmits signals which are transmitted from the terminal T1 through the network 22 and the junctor RJ1 to the receiver R1. These signals include a designation of the priority and an operator class of call. The common logic then selects a DSA trunk such as D111, obtains the service of a marker 21A and via conductors of the data bus 30 supplies the designations of the terminals T1 and one of the terminals of trunk D111 along with the priority and class information for the call which is stored in the marker 21A. The marker then selects and establishes a connection through the network 22 from terminal T1 to the terminal of trunk D111, and also via conductors of the group 10 supplies the priority and class information to operate relays in the trunk D111.

The trunk D111 now calls for the service of a DSA marker which is on line, which we will assume to be marker 1A. The connection is then completed in a manner which will be described with reference to FIG. 1.

Figure 3:
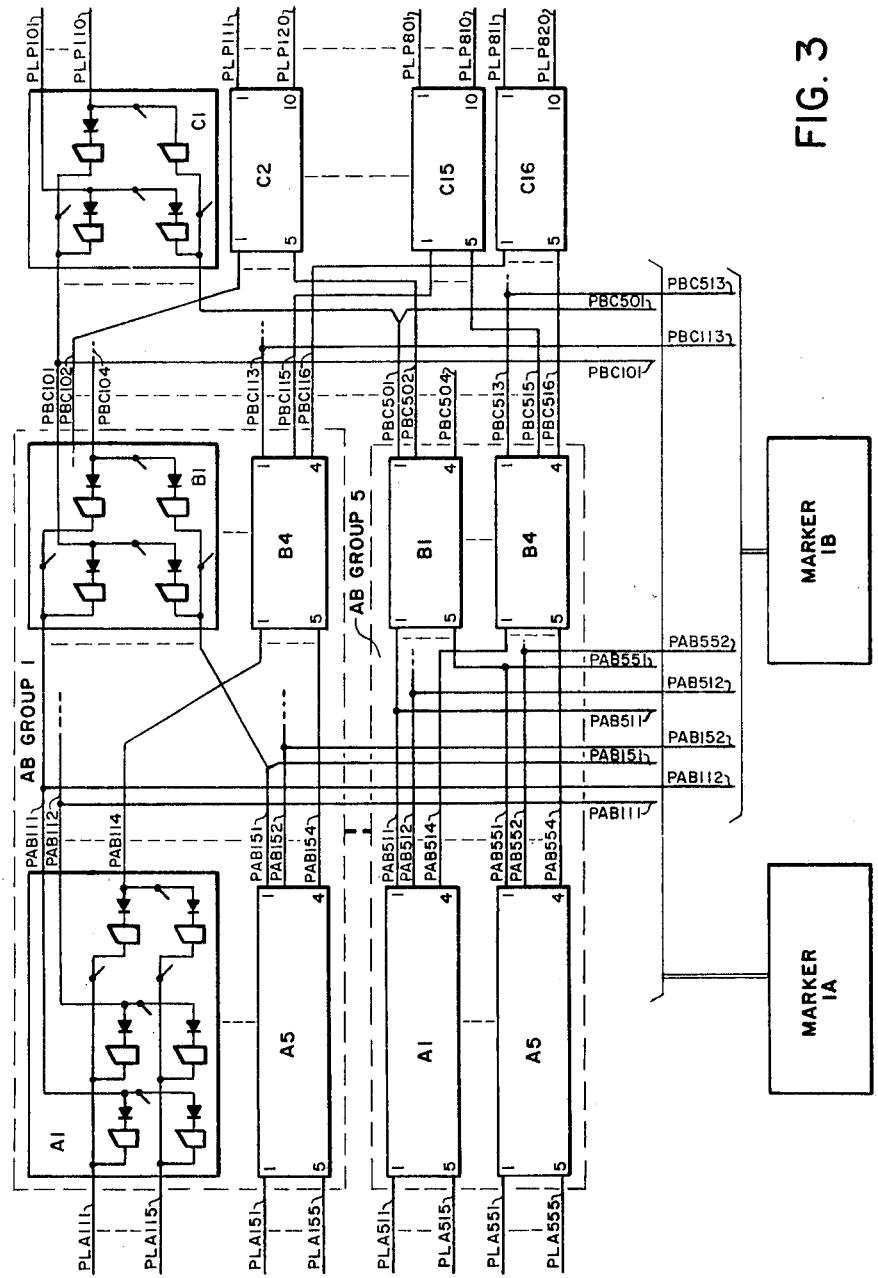
FIG. 3 is a diagram of the switching network used in the arrangement of FIGS. 1 and 2 showing particularly the pull conductors and operate windings of the crosspoint relays.

Since the call for service and trunk identification arrangement between the DSA trunks and the markers 1A and 1B makes use of the switching network 2, using diodes in series with the pull windings to prevent sneak paths via reverse direction of current flow, it is possible to provide separate paths using a completely separate set of diodes for the connections to the two markers 1A and 1B. The arrangement of the coordinate matrices in the switching network 2 is shown in FIG. 3. This figure shows only the pull windings and P conductors, but it is readily apparent that the other six conductors are always associated therewith.

The network arrangement shown in FIG. 3 serves a maximum of one hundred twenty-five DSA trunks and twenty positions, each position having twenty links. There are five AB groups designated AB group 1–AB group 5. Each AB group has five (5 x 4) A matrices and four (5 x 4) B matrices. Thus each AB group has twenty-five inlets and sixteen outlets. Within each AB group each A matrix has a link connecting it to each B matrix. These links are designated by a three digit number designating respectively the AB group, the A matrix in the group, and the B matrix in the group. There are sixteen (5 x 10) C matrices, each AB group having a link connected to each C matrix. The BC links have a three digit designation, the first digit designating the AB group, and the last two digits designating the C matrix. Likewise the output of the C matrices have three digit designations, the first digit designating one of the eight links of a position, and the last two digits designating the position. The C matrices are in pairs with the first matrix of each pair serving positions 1 to 10 and the second serving positions 11 to 20. Thus the P leads from the outputs of the first pair of matrices C1 and C2 are designated PLP101–PLP120 and those from the last pair C15 and C16 are designated PLP801–PLP820. At the input side of the network the terminals have three digit designations, designating respectively the AB group, the A matrix within the group, and the input of the A matrix. Thus the P leads at the terminals of the first A card of the first A group are designated PLA111–PLA115, and those of the last matrix of the last group are designated PLA551–PLA555 for a total of 125 input terminals.

For call-for-service and AB group identification each marker requires a connection to one P lead of a BC link of each AB group. Therefore marker 1A is connected via the five BC-link P leads, PBC101, PBC201, PBC301, PBC401, and PBC501; these being the P leads to the first outlet of the first B matrix of each AB group. The connections to the marker 1B use the first outlet of the matrix B4 of each AB group, namely the five P leads, PBC113–PBC513.

For the inputs to the A card scanner each marker requires a P lead connection to one link of each A matrix of each AB group. Therefore marker 1A is connection to the P lead of the first output of each A matrix, and marker 1B uses the P lead of the second outlet of each A matrix. Thus marker 1A is connected via the twenty-five AB link P leads PAB111, PAB121–PAB151; PAB211, PAB221–PAB251 etc. up to PAB511–PAB551. Similarly marker 1B is connected via the twenty-five AB link P leads PAB112, PAB122–PAB152 etc. up to PAB512–PAB552. It will be readily apparent in tracing the connections from the PLA conductors of the trunks through the network to the P lead connections to the markers that marker 1A uses a completely separate set of diodes from those used by marker 1B. Thus a shorted or open diode in a network can cause trouble in only one marker, and the maintenance apparatus can be designed to readily detect the source of trouble. The parity check arrangement of FIG. 1 aids in the trouble detection.

MARKERS

The DSA markers 1A and 1B are shown as blocks in FIGS. 2 and 3, and by a partial schematic and functional block diagram in FIG. 1.

The allotter 1LA causes the marker 1A to be on line for two minutes while the marker 1B is on standby, followed by two minutes with marker 1B on line and marker 1A on standby. When marker 1A is on line relay 120L operates and completes a connection to the sequence and supervisory circuit 1200 for transfer relays including 12TC. In the event of an emergency the maintenance and supervisory control unit 1MS can under manual control cause the allotter unit to transfer markers immediately. Otherwise, if a trouble occurs, the transfer will occur after the trouble recorder has been called in to register the trouble. The maintenance and supervisory unit 1MS has manual capabilities to busy out one marker to keep the other marker on line continually. Another aspect is that a transfer may be caused after the on line marker processes its call, if a transfer is desired, without affecting service. In addition a failed marker may be put on line when no calls for service exist to allow it to process a test call to a test position or vice versa. It can cycle in this test mode to allow trouble recording and scope trouble shooting.

The sequence and supervisory control unit 1200 contains a clock generator which gates a sequence counter through twenty-five states. In addition to the sequence state circuits, the sequence and supervisory unit 1200 supplies various supervisory logic control functions.

The various scanners contain counters comprising bistable flip-flop devices controlled by signals from the sequence circuits 1200 to scan the input conductors one at a time and to stop upon finding a given condition thereon to supply a corresponding output signal, as described in the parent patent.

The call-for-service part of typical calls will be explained with reference to FIG. 1.

When a call is received at the trunk D111 for extension to an operator position is closes a set of contacts to operate a gate relay G, only one set of contacts of which is shown. This set of contacts of the relay G extends a −16 volt potential which extends via a resistor and a set of contacts operated in the normal mode in the marker, and relay 12TC via lead TNP, the G relay contacts, and another resistor to the lead PLA111. The −16 volt potential extends from lead PLA111 through the operate winding and series diodes of the A and B stages and appears at lead PBC101 extending to the AB group scanner 103 in the trunk identifier. The potential is also extended through an OR gate to a call-for-service conductor CFS.

A trunk identification arrangement including scanner 103 and other scanners not shown is of the type covered by the Bruglemans Patent 3,211,837 issued Oct. 12, 1965. The marker responds to the CFS signal to operate the AB group scanner 103 to find the calling potential on lead PBC101. This identifies one of five AB groups of the switching network. The marker completes the call to a position circuit, such as P1, as described in the parent patent.

The marker is also arranged to service calls originating by the operators at the positions, using a sequence of operation substantially the same as that used for servicing calls from the trunks.

When the operator initiates a call by operating a key (not shown), the call for service is indicated to the marker via contacts of a gate relay PGT to complete a connection from −16 volts on the common conductor PCFSP to common conductor PCFS which produces a signal on lead SCFS in the marker. The marker now proceeds in substantially the same sequence as in a call for the normal mode, to complete a connection to a DSA trunk, as described in the parent patent.

PARITY OF CALL FOR SERVICE SIGNALS

The parity check arrangement is shown in FIG. 1, which compares the call-for-service signals of the two markers and indicates parity in each marker if the signals agree. As explained with reference to FIG. 3, the two markers use different P lead connections, and therefore different diodes in the DSA network 2. Also the source of negative potential to the DSA trunks via the leads such as TNP is supplied separately in each marker via its own resistors. Each marker also has the connection from these resistors to the −16 volt source separately fused. Therefore, a component failure can cause a trunk call-for-service signal to be received in one marker but not in the other.

It is desirable that a failure such as a bad diode in the switching network does not prevent a trunk call-for-service from being detected. If the active marker cannot act on a call signal, transfer to the standby marker should take place. Since any parity detecting circuit can be defective in such a manner that it continues to indicate satisfactory parity, two such detectors are provided, one per marker, as shown in FIG. 1. No attempt has been made to design the circuit to continuously compare the outputs since the comparison circuit could itself become defective. Rather, the parity circuit output is used only when its marker is active—which happens on a regular basis. Only if the parity circuit is bad and also the call-for-service circuit will the trouble condition exist. This possibility of two faults, although remote, will be detected unless the other parity circuit is defective—a highly unlikely three fault occurrence.

It would be possible to design the parity circuit with electronic gates, but feedback problems may arise from tying together the inputs of gates in different markers. Therefore relay circuitry is used to derive the exclusive-or function needed for a parity signal. Thus in marker 1A the call-for-service signal CFS drives a relay driver 1501 which operates the parity check relay 15PA, and in marker 1B the call-for-service signal CFS–B via relay driver 1502 operates the parity check relay 15PB. The two relays 15PA and 15PB and their contacts form exclusive-or circuits to the two parity or mismatch conductors PAR and PAR–B. The ground potential supplied to either one of these leads via the relay contacts constitutes a logically false signal which may be considered as a mismatch signal or no-parity signal. With both relays operated the circuit to lead PAR in marker 1A and to lead PAR–B in marker 1B are open, which corresponds to a true signal. In marker A the fault-indicating gate 1511 which has the function ($\overline{PAR}$ S1 $\overline{SCFS}$ $\overline{CFS}$ EOL) is inhibited and therefore does not generate a parity fault signal at its output. There is a similar gate, 1511–B, in marker 1B. This signal EOL (electronic on line) is true whenever the marker is in the active on line condition. The signal S1 is true during a sequence state S1.

Considering now the possible signal conditions in the parity check circuit of marker 1A when it is active, there are four possible combinations of a call-for-service signal and parity signal as follows:

CFS·PAR
$\overline{CFS}$·PAR
CFS·$\overline{PAR}$
$\overline{CFS}$·$\overline{PAR}$ In the first two cases parity is true so the marker remains in the active on line condition. In the third case there is a call-for-service signal but parity is false, indicating that the other marker 1B did not receive the call-for-service signal. In this case the information does not indicate which marker has a trouble condition, so the active marker 1A is left in the active condition on line to process the call until it stops at some point in the sequence, at which time more information about the fault is available to record in the trouble recorder, after which transfer can be initiated. In the fourth situation there is no call-for-service signal and parity is false in this marker. Since there is no call-for-service signal there is no basis for processing the call in this marker. However the false parity indicates that the other marker has received a call-for-service signal, and therefore in this situation transfer to the other marker should be initiated to permit it to attempt to process the call.

Essentially similar operation of the parity check circuit is obtained on a switchboard call for service. The signal SCFS via relay driver 1503 operates the parity check relay 15PA in marker 1A and in like manner the parity check relay 15PB in marker 1B is operated. If a call for service signal is received in one marker and not in the other then only one of the two parity check relays 15PA and 75PB will be operated placing ground potential, a false signal value, on the leads PAR in marker 1A and lead PAR–B in marker 1B. If the signal was not received in marker 1A the signal CFS will be not true and also the signal SCFS is not true since there is no switchboard call at this time. Thus the gate 1511 is enabled to produce a true output signal generating signal PARF which is sent via the test access circuit to a recorder, and also the relay driver 1512 operates to close its contact to complete a circuit to the maintenance supervisory circuit 1MS.

By way of example assume that the parity output of marker A is open such that the signal stays always true, and that then a second fault, as a contact of relay 13CON1 staying open occurs, so that marker A does not receive the call-for-service signal at the output of gate 1511 but because of the fault in the parity circuit the parity output signal in marker A remains true. When normal transfer to marker B occurs, the signal PAR–B will be false and cause the call for the trouble recorder to be generated. Analysis will pinpoint the bad contact of relay 13CON1 but ignore the fault in the marker 1A parity circuit. To alleviate this problem, the output of both parity circuits is transmitted via the test access circuit when the trouble recorder is called in.

Thus a parity check circuit arrangement has been provided which is particularly useful in the arrangement in which two markers are provided with only one on line at a time with transfer from one marker to the other occurring periodically, for example at two minute intervals.

While I have described above the principles of my invention in connection with specific apparatus, it is to be clearly understood that this description is made only by way of example and not as a limitation to the scope of my invention.

What is claimed is:

1. An inequality test circuit for first and second duplicate units which are alternatively in active and standby service, to check a given signal condition supplied simultaneously to both units via different circuits; there being frequent periodic switching between the condition in which the first unit is active and the second unit is in standby, and the condition in which the second unit is active and the first unit is in standby, as long as both said units are in proper operating condition;

said inequality test circuit comprising first and second sections individually associated with the first and second units respectively, each section having a device connected to detect the presence of said given signal condition in the associated unit, exclusive-or circuit means comprising said devices of both sections and a mismatch conductor (PAR and PAR–B) in each section operative responsive to detection of the given signal condition by one of the devices but not the other to produce a mismatch signal condition normally on both mismatch conductors via separate paths; and fault-indicating means (1511) in each section having an input connection from the mismatch conductor of that section, effective to transmit a fault signal responsive to conditions including coincidence of (a) the unit with which the section is associated being in active condition and (b) presence of a mismatch signal condition on the mismatch conductor of that section;

whereby a single fault comprising detection of the given signal condition in only one unit is indicated by said fault signal being transmitted by each section of the inequality test circuit when the associated unit is active; and whereby under circumstances of one additional fault in the inequality test circuit itself at least one section transmits the fault signal during the active period of its associated unit.

2. An inequality test circuit as claimed in claim 1, wherein said device of each section comprises a relay operated in response to said given signal condition being present in said associated unit, and wherein said mismatch signal is produced in each section via a circuit path including contact sets of the relays of both sections.

3. An inequality test circuit as claimed in claim 2, wherein the relay in each of said sections includes two normally closed contact sets and two normally open contact sets, with each normally closed contact set of each relay connected in series with a normally open contact set of the other relay to form four series paths, and the mismatch signal is produced in each section via a circuit path comprising the parallel connection of two of said series paths, one series path having its normally open contact set on the relay of its own section and the other series path having its normally open contact set on the relay of the other section.

4. An inequality test circuit as claimed in claim 2, wherein said fault-indicating means of each section comprises a gate circuit, and wherein said conditions for transmitting a fault signal further include (c) absence of said given signal condition in the associated unit.

5. An inequality test circuit as claimed in claim 2, wherein said units are markers of a communication switching system, and said given signal condition is a call-for-service signal from a switching network terminal, the call-for-service signal from a network terminal being supplied to the two markers via different paths so that the call-for-service signal may be received at only one marker if there is a circuit failure in one of the paths, whereby said inequality test circuit is operative to detect such failure in the call-for-service circuit path.

6. An inequality test circuit as claimed in claim 5, wherein a call-for-service signal may be received from a terminal at either side of said switching network, and said relay in each section is operated in response to a call-for-service signal from the terminals at either side of the network.

7. An inequality test circuit as claimed in claim 6, wherein said fault-indicating means of each section comprises a gate circuit, and wherein said conditions for transmitting a fault signal further include (c) there being no call-for-service signal from either side of the network in the associated marker.

References Cited

UNITED STATES PATENTS

| | | | |
|---|---|---|---|
| 3,060,273 | 10/1962 | Nowak et al. | 179—175.2 X |
| 3,161,732 | 12/1964 | Martin et al. | 179—175.2 |
| 3,252,149 | 5/1966 | Weida et al. | 340—172.5 |
| 3,299,220 | 1/1967 | Wedmore | 179—175.2 |
| 3,409,877 | 11/1968 | Alterman et al. | 340—172.5 |

MALCOLM A. MORRISON, Primary Examiner

C. E. ATKINSON, Assistant Examiner

U.S. Cl. X.R.

179—18.21, 175.2; 235—153